(12) United States Patent
Shoen

(10) Patent No.: US 6,328,514 B1
(45) Date of Patent: Dec. 11, 2001

(54) ODOMETER CABLE DISCONNECT BLOCKING DEVICE

(75) Inventor: Mark V. Shoen, Phoenix, AZ (US)

(73) Assignee: U-Haul International, Inc., Phoenix, AZ (US)

( * ) Notice: Subject to any disclaimer, the term of this patent is extended or adjusted under 35 U.S.C. 154(b) by 0 days.

(21) Appl. No.: 09/568,621

(22) Filed: May 10, 2000

(51) Int. Cl.$^7$ .............................. F16B 37/14; F16C 1/00; F16H 57/02

(52) U.S. Cl. ........................ 411/374; 411/372.5; 411/910; 403/11; 403/315; 464/52; 74/12; 74/606 R

(58) Field of Search ...................... 403/315, 11; 411/910, 411/389, 374, 397, 372.5, 372.6, 373; 74/12, 606 R; 464/52

(56) References Cited

U.S. PATENT DOCUMENTS

| | | |
|---|---|---|
| 1,300,275 | 4/1919 | Johnson . |
| 1,477,564 | 3/1923 | Norlund et al. . |
| 2,316,695 * | 4/1943 | Jaffa . |
| 2,801,530 | 8/1957 | Holt . |
| 3,818,731 * | 6/1974 | Waling . |
| 4,253,509 | 3/1981 | Collet . |
| 4,342,530 * | 8/1982 | Baker . |
| 4,521,146 * | 6/1985 | Wherton . |
| 4,560,365 | 12/1985 | Weaver . |
| 4,569,259 | 2/1986 | Rubin et al. . |
| 4,723,866 | 2/1988 | McCauley . |
| 4,930,959 * | 6/1990 | Jagelid . |
| 5,364,213 * | 11/1994 | Teramura . |
| 5,469,726 * | 11/1995 | Rushing . |

* cited by examiner

Primary Examiner—Flemming Saether
(74) Attorney, Agent, or Firm—Jeffer, Mangels, Butler & Marmaro LLP

(57) ABSTRACT

A device for preventing disconnection of a coupling. The device includes a main body portion having defined therein a fastener chamber and an opening in communication with the fastener chamber. The opening is located above the fastener chamber. In a preferred embodiment, a standard size socket cannot be inserted into the opening.

12 Claims, 7 Drawing Sheets

ODOMETER CABLE DISCONNECT BLOCKING DEVICE

FIELD OF THE INVENTION

The present invention relates to a device for preventing disconnection of couplings, and more particularly to preventing disconnection of an odometer cable.

BACKGROUND OF THE INVENTION

It is often desirable for business concerns that rent automobiles and charge "by the mile" to know how many miles a rented automobile has traveled. This is typically done by noting the odometer reading at the beginning and end of a trip. However, disconnection of the odometer cable from either the transmission end or the odometer end permits driving of the automobile without indication on the odometer.

In order to prevent disconnection of the odometer cable, locks and security devices have been devised. Prior disconnection prevention devices are often complex and very difficult to install or remove. Removal often requires destroying the device using a saw or the like. Other prior disconnection devices, on the other hand, are easily removable by readily available tools.

A need exists for an odometer cable disconnection prevention device that is simple in design and easy to install and remove with the proper, non-readily available tools.

SUMMARY OF THE PREFERRED EMBODIMENTS

In accordance with one aspect of the present invention there is provided a device for preventing disconnection of a coupling. The device includes a main body portion having defined therein a fastener chamber and an opening in communication with the fastener chamber. The opening is located above the fastener chamber.

In accordance with another aspect of the present invention there is provided a device for preventing disconnection of a coupling that includes a main body portion, a pair of tines and a pair of webs. The main body portion has a surface in which is defined a cut-out portion. The main body portion also has a top section and a bottom section. Within the main body portion are defined a fastener chamber and an opening. The fastener chamber is adapted to receive an internally threaded head of a threaded fastener. The opening is located above the fastener chamber and coaxial therewith, and has an upper portion and a lower portion that communicates the upper portion with the fastener chamber. The upper portion has a larger diameter than the lower portion. The pair of tines extend in fixed spatial relation laterally from the bottom section of the main body portion. The pair of webs each extend from the main body portion to one of the pair of tines.

In acordance with an additional aspect of the present invention, there is provided a device for preventing disconnection of a coupling. The device includes a main body portion, a pair of tines and a pair of webs. The main body portion has defined therein a fastener chamber adapted to receive an internally threaded head of a threaded fastener, and an opening located above and in communication with the fastener chamber and coaxial therewith. The opening is adapted to receive a shank of a threaded fastener. The pair of tines extends in fixed spatial relation laterally from the main body portion. The pair of webs each extend from the main body portion to one of the pair of tines.

In accordance with still another aspect of the present invention, there is provided a system for preventing disconnection of a coupling, such as an odometer coupling. The system includes a device for preventing disconnection of a coupling as described herein, a first threaded fastener having a head and a shank, and a second threaded fastener having an internally threaded head. The fastener chamber receives the internally threaded head of the second threaded fastener, the upper portion of the opening receives the head of the first threaded fastener, and the shank of the first threaded fastener extends through the lower portion of the opening and is threadedly received by the internally threaded head of the second threaded fastener.

In accordance with yet another aspect of the present invention, there is provided a method of preventing disconnection of a coupling having a retention member, the retention member having defined therein an opening. The method includes the steps of providing a device as described herein; extending a first threaded fastener, having an internally threaded head, through the opening of the retention member and threadedly engaging the first threaded fastener with a threaded opening coaxial with the opening of the retention member; and engaging a second threaded fastener within the opening in the device and within the internally threaded head of the first threaded fastener.

Other objects, features and advantages of the present invention will become apparent to those skilled in the art from the following detailed description. It is to be understood, however, that the detailed description and specific examples, while indicating preferred embodiments of the present invention, are given by way of illustration and not limitation. Many changes and modifications within the scope of the present invention may be made without departing from the spirit thereof, and the invention includes all such modifications.

BRIEF DESCRIPTION OF THE DRAWINGS

The invention may be more readily understood by referring to the accompanying drawings in which.

Like numerals refer to like parts throughout the several views of the drawings.

DETAILED DESCRIPTION OF THE PREFERRED EMBODIMENTS

Figure 1:
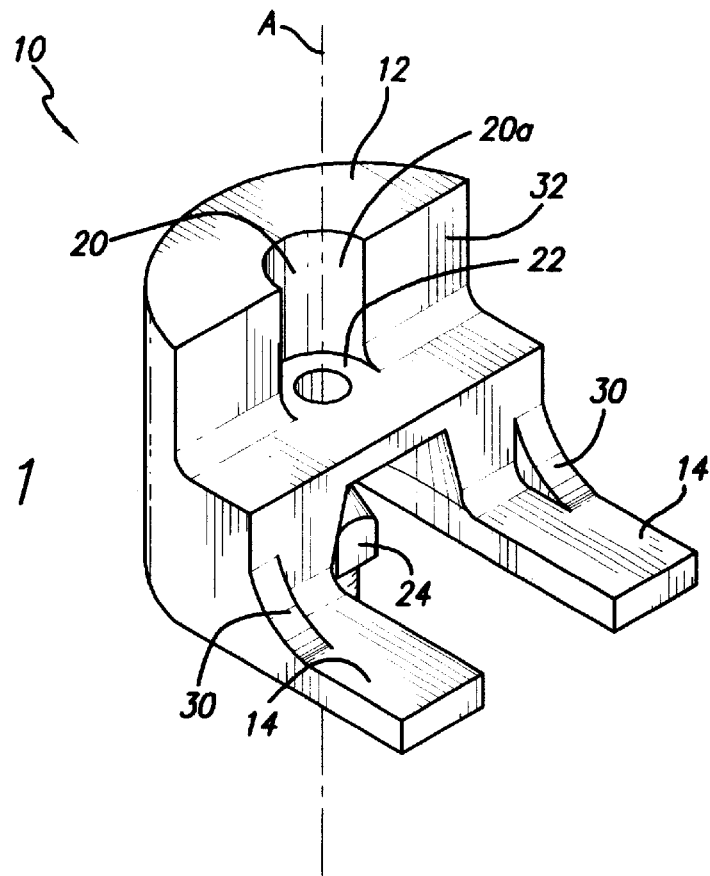
FIG. 1 is a perspective view of a disconnection prevention device in accordance with a preferred embodiment of the present invention.

Referring to FIGS. 1–6, a first preferred embodiment of a disconnection prevention device 10 is shown. The device 10 includes a main body portion 12 having defined therein an opening 20 and a fastener chamber 16. The opening 20 has an upper portion 20a and a lower portion 20b. Preferably, the upper portion 20a has a larger diameter than the lower portion 20b, thus forming a fastener seat 22 as shown in FIG. 1. The upper and lower portions 20a and 20b of the opening 20 define a longitudinal axis A that preferably extends in a direction generally perpendicular to fastener seat 22.

The main body portion 12 has top and bottom sections 12a and 12b, respectively. The fastener chamber 16 is preferably defined in the bottom section 12b of the main body portion 12 and is adapted to receive the head of a threaded fastener (described more fully below). The opening 20 is defined in the top section 12a of the main body portion 12 and is located above the fastener chamber 16. The lower portion 20b of the opening 20 communicates the upper portion 20a with the fastener chamber 16. Preferably, the top section 12a of the main body portion 12 includes a cut-out portion 32, for proper fit with the transmission cable assembly 60 with which the device will be used (described more fully below).

Figure 2:
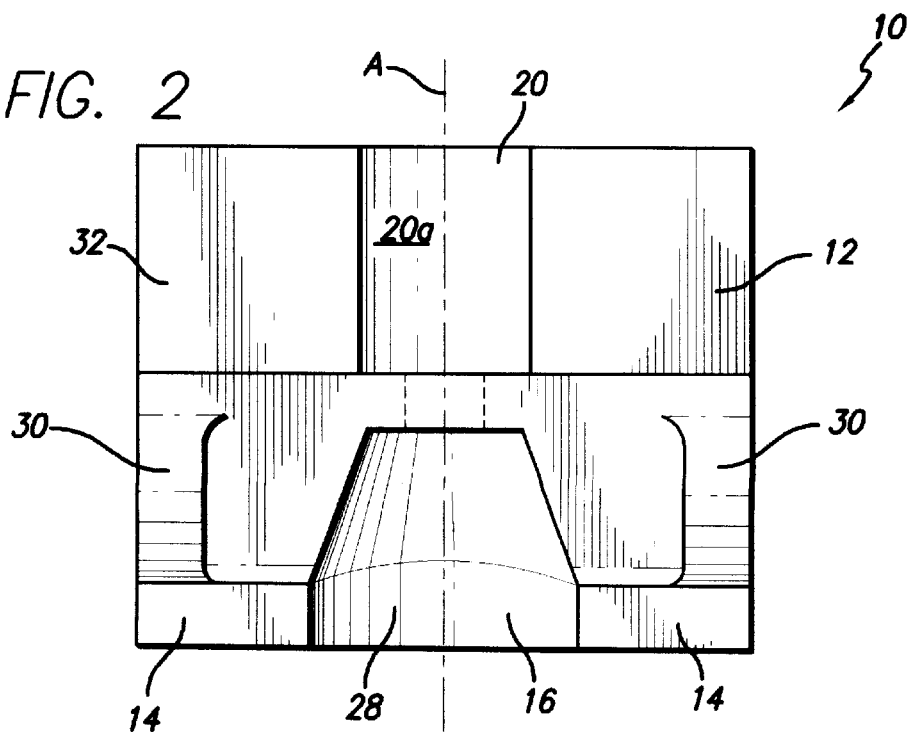
FIG. 2 is a front elevation of the disconnection prevention device of FIG. 1 showing axis A.
Figure 3:
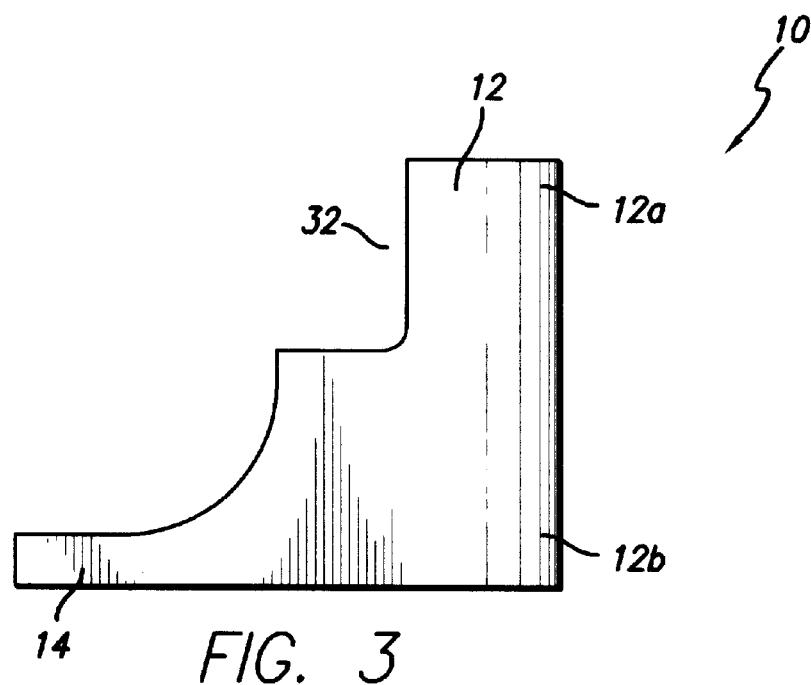
FIG. 3 is a side elevation of the disconnection prevention device of FIG. 1 showing the tines extending from the main body portion.
Figure 4:
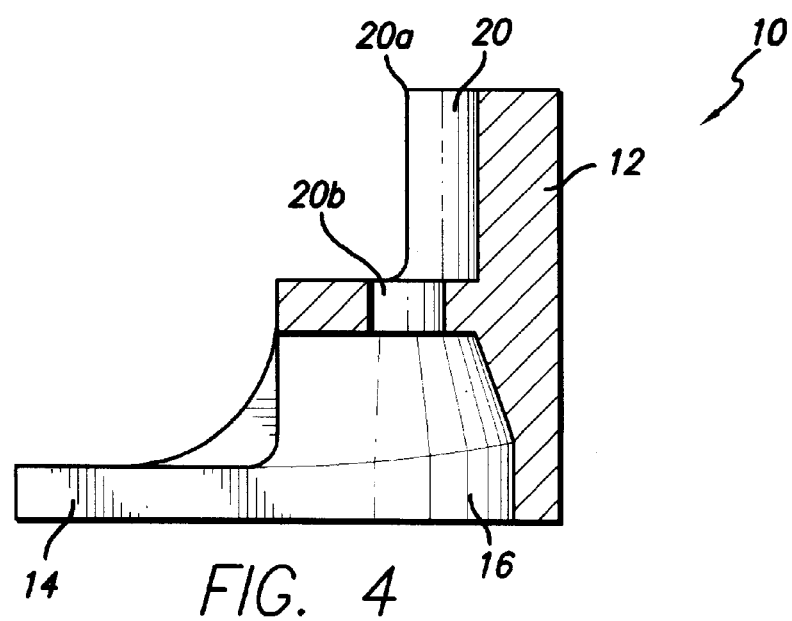
FIG. 4 is sectional side elevation of the disconnection prevention device of FIG. 1.
Figure 5:
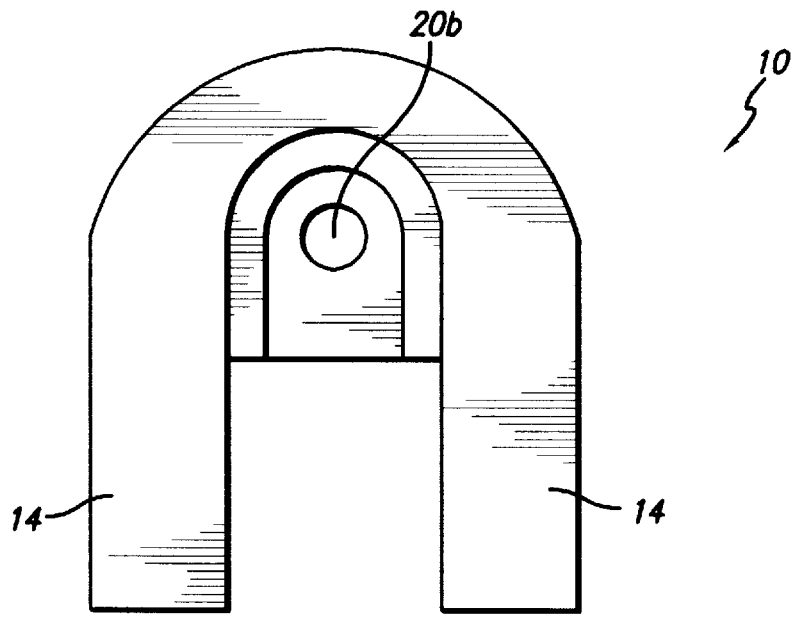
FIG. 5 is a bottom plan view of the disconnection prevention device of FIG. 1.
Figure 6:
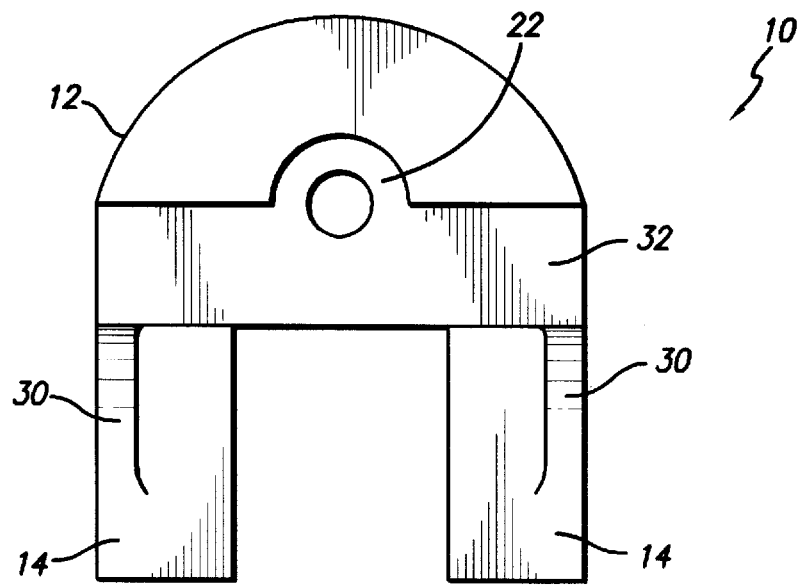
FIG. 6 is a top plan view of the disconnection prevention device of FIG. 1.

In a preferred embodiment, a pair of tines 14 preferably extend laterally from the bottom section 12b of the main body portion 12 in a direction substantially perpendicular to axis A and are in fixed spatial relation to one another. Preferably, the main body portion 12 and the tines 14 define an opening 28. As shown in FIG. 2, the device 10 preferably includes webs 30 extending from the main body portion 12 to the tines 14.

In a preferred embodiment, the main body portion 12 and the tines 14 are cast from a rigid material such as a glass reinforced nylon resin or other plastic. Alternatively, the device 10 can be molded, machined or the like and can be comprised of a rigid, durable metal such as stainless steel or aluminum, or any other desired material.

Figure 7:
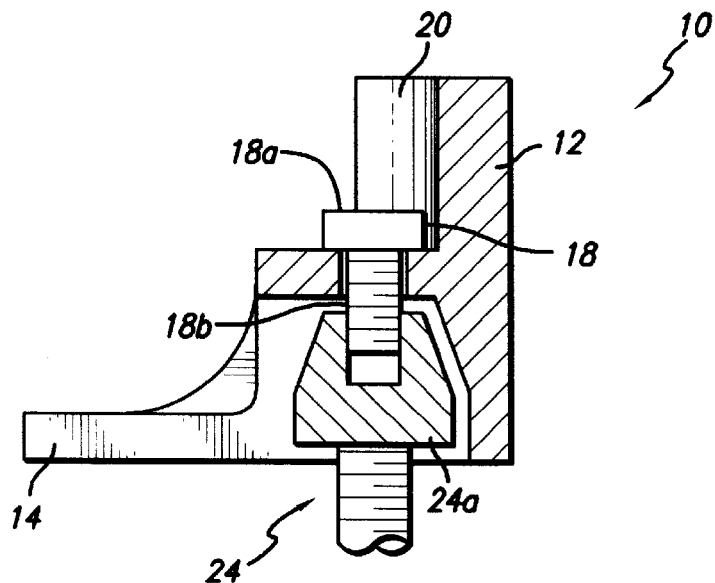
FIG. 7 is sectional side view of the disconnection prevention device of FIG. 1 in combination with first and second threaded fasteners.

Referring to FIG. 7, the device 10 preferably is used in combination with a first threaded fastener 18 and a second threaded fastener 24 having an internally threaded head, which are both known to those skilled in the art. It will be understood that the first threaded fastener 18 can be any threaded fastener, for example, a bolt or a screw. In a preferred embodiment, the first threaded fastener 18 is a bolt. The threaded fastener 18 has a head 18a and a shank 18b. The head 18a of the threaded fastener can have any number of sides. For example, the head 18a can be five sided, thereby preventing someone having a standard sized socket for use on a six-sided headed bolt from removing the bolt (as described below). Standard sized socket sets are well known in the art, and a skilled artisan will understand what standard sized thin-walled and thick-walled sockets are.

The second fastener 24, as mentioned, has an internally threaded head. The internally threaded head is adapted to threadedly receive shank 18b of first threaded fastener 18. Second threaded fastener 24 is preferably adapted to be threadedly engaged with a threaded opening 62 in a transmission housing that underlies opening 62 in retention member 72 (described more fully below).

Figure 8:
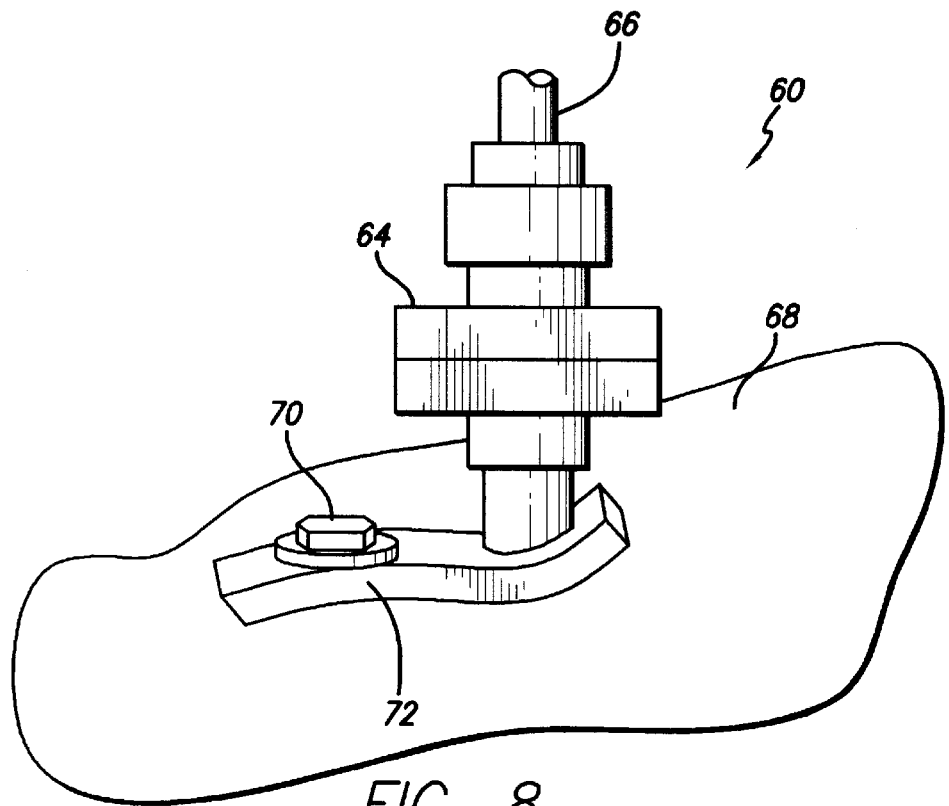
FIG. 8 is a perspective view of a prior art transmission cable assembly with which the device of FIG. 1 can be used.
Figure 9:
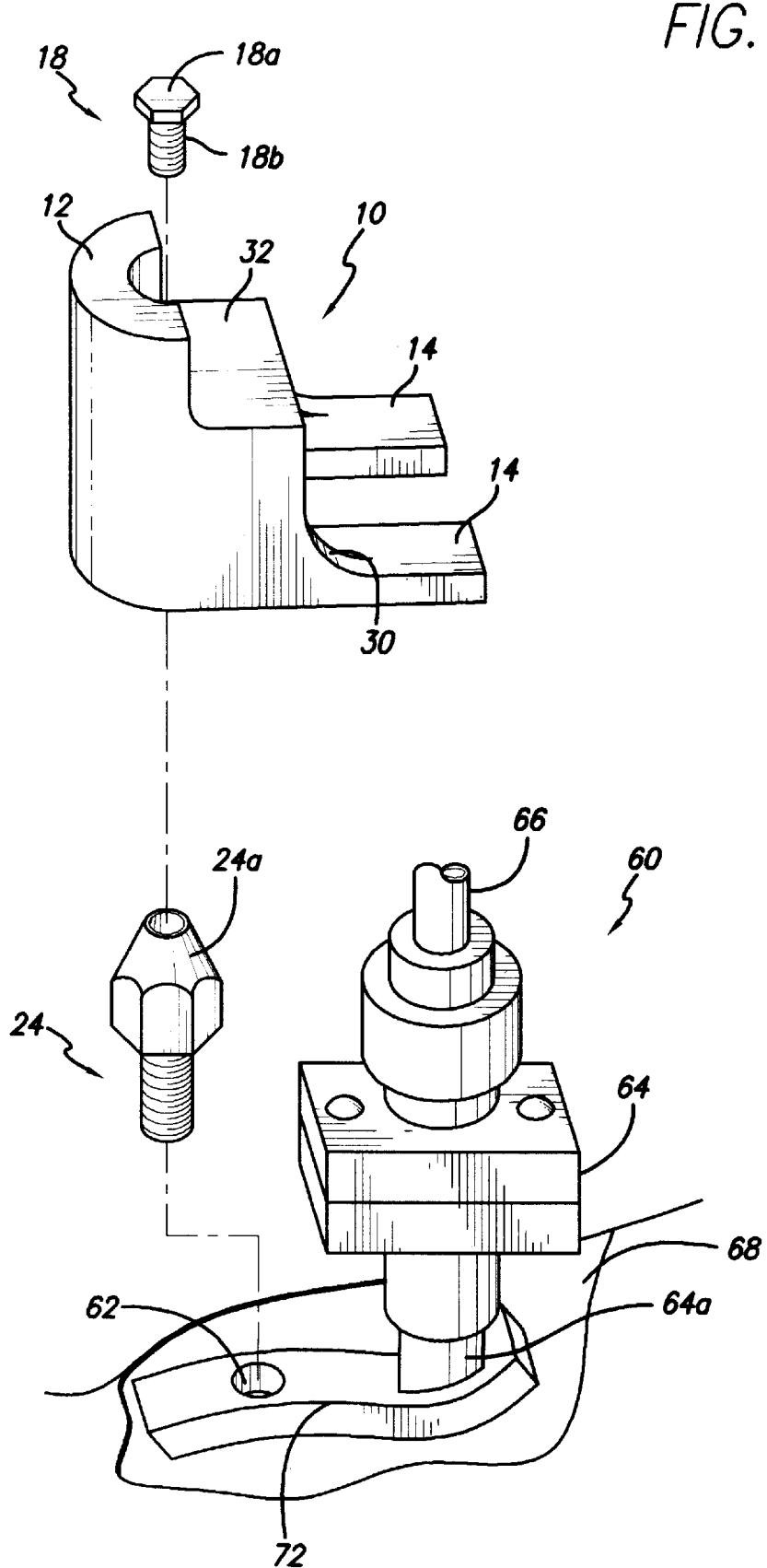
FIG. 9 is an exploded perspective view of the device of FIG. 1 and a transmission cable assembly with the original threaded fastener removed.
Figure 10:
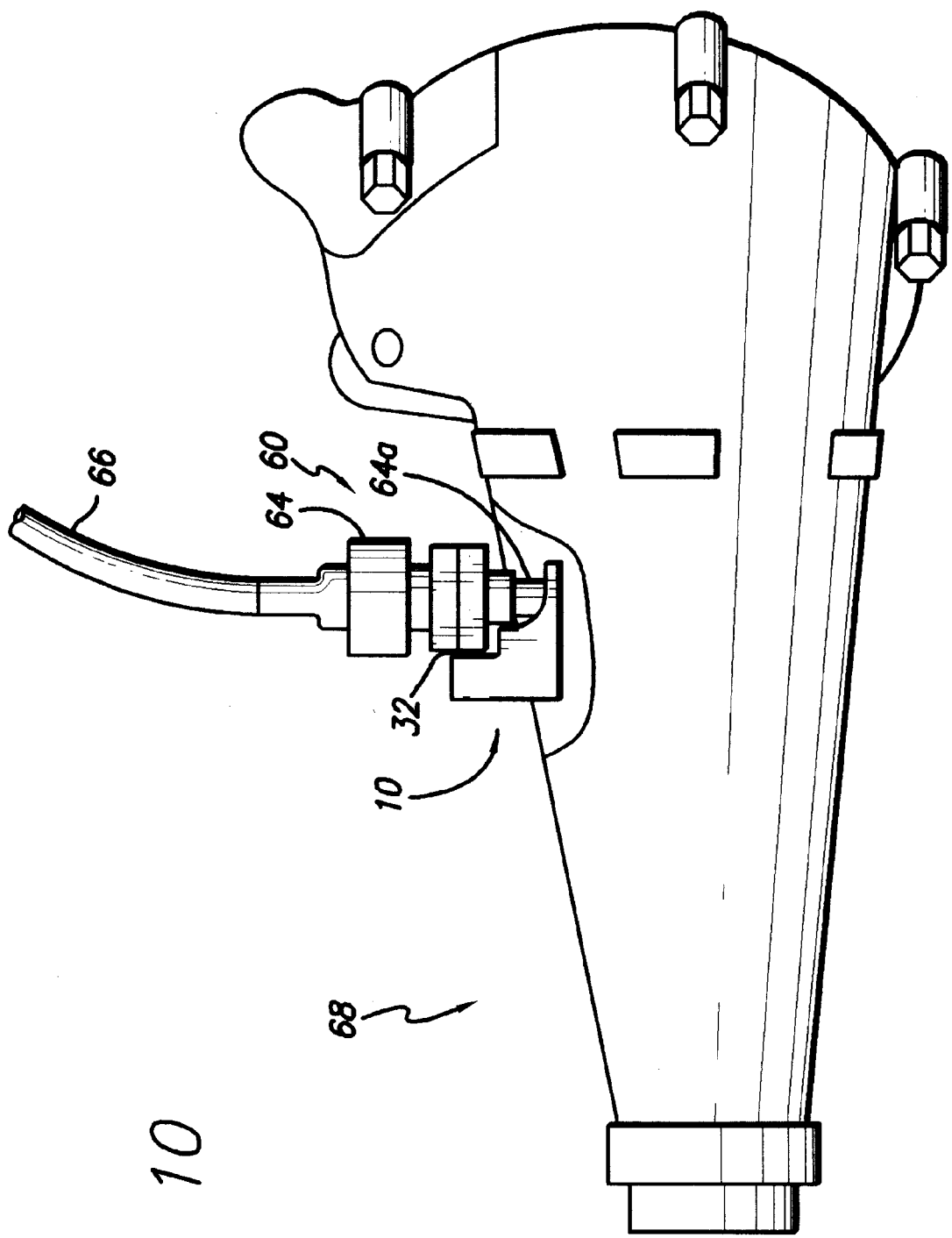
FIG. 10 is a perspective view of a transmission housing having the device of FIG. 1 installed on the transmission cable assembly.

Referring to FIGS. 8–10, the connection of device 10 to a conventional transmission cable assembly 60 will be described. Many transmissions include a ratio adapter 64 to which the odometer cable 66 is connected. The ratio adapter 64 is attached to the transmission (which is disposed within the transmission housing 68) and secured thereon via a retention member 72 and a threaded fastener 70, as shown in FIG. 8. The ratio adapter 64, and, therefore, the odometer cable 66 can be easily disengaged from the transmission and transmission housing 68 by removing the threaded fastener 70 and therefore the retention member 72. To install the device 10, the threaded fastener 70 is removed and second threaded fastener 24 is extended through the opening 62 (defined in retention member 72) vacated thereby and threaded into the threaded opening defined in transmission housing 68. Device 10 is placed over the head of second threaded fastener 24, such that fastener chamber 28 receives the head 24a of the second threaded fastener 24, and axis A is substantially coaxial with the axis of the second threaded fastener 24. The bottom of the tines 14 preferably engage the surface of the transmission 68 or other object with which the device 10 can be used.

First threaded fastener 18 is slipped into opening 20 such that shank 18b extends through lower portion 20b of opening 20 and is threaded into internally threaded head 24a of second threaded fastener 24, preferably until head 18a of the first threaded fastener 18 engages fastener seat 22. A washer, lock washer, etc. can be provided for use with either or both threaded fasteners 18 and 24 as desired.

FIG. 10 is a perspective view showing device 10 installed. When installed the tines 14 are disposed on opposite sides of the lower portion 64a of ratio adapter 64 and cut-out portion 32 provides a proper fit with ratio adjuster 64. It will be understood that cut-out portion 32 can be omitted, or other cut-out portions can be included depending on the configuration of the transmission cable assembly with which device 10 is being used. For example, for a transmission cable assembly that is not provided with a ratio adapter, cut-out portion 32 can be omitted.

In a preferred embodiment, first threaded fastener 18 is threaded into head 24a of second threaded fastener 24 using a thin-wall deep socket. Thin-walled deep sockets are not readily available, thus making removal of first threaded fastener 18 and, therefore, the device 10, difficult. A thin-walled deep socket is employed because, in a preferred embodiment, the upper portion 20a of the opening 20 is sufficiently deep so as to prevent a conventional thin-wall short socket from reaching the threaded fastener 18, and of sufficiently small diameter so as to prevent thick-walled sockets from fitting in the upper portion 20a of the hole 20.

As mentioned above, first threaded fastener 18 can be any threaded fastener known to those skilled in the art. For example, a bolt or screw, etc. may be employed. However, the first threaded fastener 18 is preferably not a conventional hex-head fastener. In a preferred embodiment the first threaded fastener 18 has a 5-sided head. However, it is within the scope of the invention for the head of the first threaded fastener 18 to have any non-conventional shape or number of sides. For example, the head 18a of the first threaded fastener 18 may be triangular, star-shaped, square, etc. A non-conventionally shaped threaded fastener head makes the removal of the device 10 even more difficult because the socket must conform to the shape of the threaded fastener head 18a. Non-hex-head sockets are less readily available. It should be understood that the shape of the head 18*a* of the first threaded fastener 18 and the size of the upper portion 20*a* of the opening 20 is not meant to be a limitation on the present invention.

Figure 11:
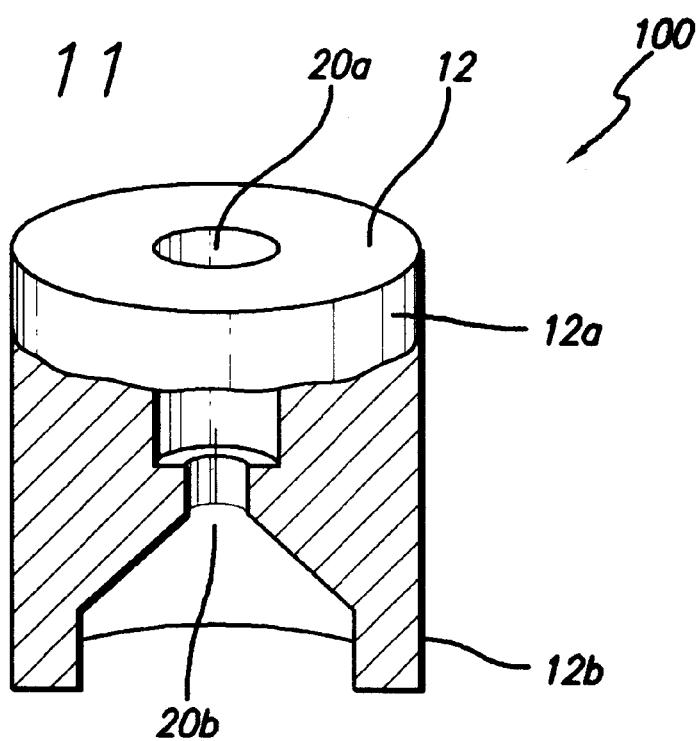
FIG. 11 is a perspective view partially in section showing a disconnection prevention device with the tines omitted in accordance with a second embodiment of the present invention.

Referring to FIG. 11, in a second embodiment of a device 100 for preventing disconnection of an odometer cable, which is a modification of device 10, tines 14 and cut-out portion 32 can be omitted. In this embodiment, device 100 includes a main body portion 12 that is substantially cylindrical.

Figure 12:
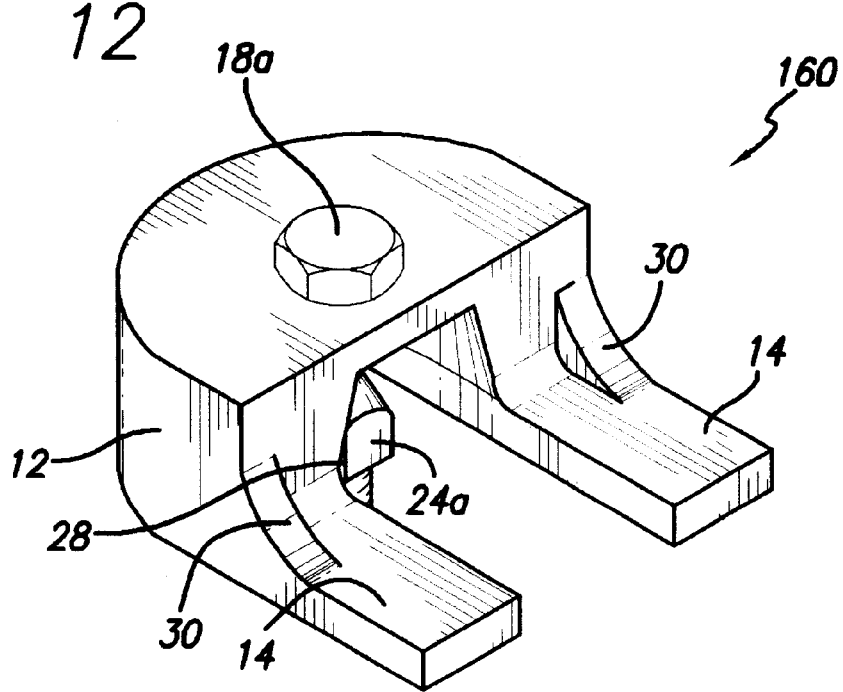
FIG. 12 is a perspective view showing a disconnection prevention device in combination with a five-sided head bolt in accordance with a third embodiment of the present invention.

Referring to FIG. 12, in a third embodiment of a device 160 for preventing disconnection of an odometer cable, which is also a modification of device 10, the top section 12*a* of the main body portion 12 and the upper portion 20*a* of the opening 20 can be omitted. In this embodiment, device 160 is preferably used in combination with a first threaded fastener 18 that has a non-standard head 18*a* configuration. For example, as shown in FIG. 12, a five-sided head 18*a* can be used.

What is claimed is:

1. A device for preventing disconnection of a coupling, said device comprising a main body portion having defined therein a fastener chamber and an opening in communication therewith, said opening being located above said fastener chamber, wherein said opening has an upper portion and a lower portion, said upper portion having a larger diameter than said lower portion, and said lower portion communicating said upper portion with said fastener chamber, wherein said upper and lower portions of said opening define an axis running longitudinally therethrough, wherein said main body portion has a top section and a bottom section, and wherein said device further comprises a pair of tines in fixed spatial relation extending in substantially the same direction and extending from said bottom section of said main body portion in a direction substantially perpendicular to said longitudinal axis.

2. The device of claim 1 wherein said fastener chamber is coaxial with said upper and lower portions of said opening.

3. The device of claim 1 wherein said main body portion has a surface in which is defined at least one cut-out portion, and wherein said cut-out portion communicates with said upper portion of said opening.

4. The device of claim 1 wherein said upper portion of said opening cannot receive a standard sized socket.

5. A device for preventing disconnection of a coupling, said device comprising:
   (a) a main body portion having a surface in which is defined a cut-out portion, said main body portion having a top section and a bottom section, said main body portion having defined therein
      (i) a fastener chamber adapted to receive an internally threaded head of a threaded fastener, and
      (ii) an opening located above said fastener chamber and coaxial therewith, said opening having an upper portion and a lower portion that communicates said upper portion with said fastener chamber, said upper portion having a larger diameter than said lower portion, and
   (b) a pair of tines in fixed spatial relation extending laterally from said bottom section of said main body portion, wherein said tines extend in a direction substantially perpendicular to a longitudinal axis extending through said fastener chamber and said opening, and wherein said tines extend in substantially the same direction.

6. A device for preventing disconnection of a coupling, said device comprising:
   (a) a main body portion having defined therein
      (i) a fastener chamber adapted to receive an internally threaded head of a threaded fastener, and
      (ii) an opening located above and in communication with said fastener chamber and coaxial therewith, said opening being adapted to receive a shank of a threaded fastener,
   (b) a pair of tines in fixed spatial relation extending laterally from said main body portion, wherein said tines extend in a direction substantially perpendicular to a longitudinal axis extending through said fastener chamber and said opening, and wherein said tines extend in substantially the same direction.

7. A system for preventing disconnection of a coupling, said system comprising:
   (a) a device for preventing disconnection of a coupling, said device comprising a main body portion having defined therein a fastener chamber and an opening in communication therewith, said opening being located above said fastener chamber and having an upper portion and a lower portion, said device further including a pair of tines in fixed spatial relation extending laterally from said main body portion, wherein said tines extend in a direction substantially perpendicular to a longitudinal axis extending through said fastener chamber and said opening,
   (b) a first threaded fastener having a head and a shank, and
   (c) a second threaded fastener having an internally threaded head and a shank,
   wherein said fastener chamber receives said internally threaded head of said second threaded fastener, said upper portion of said opening receives said head of said first threaded fastener, and said shank of said first threaded fastener extends through said lower portion of said opening and is threadedly received by said internally threaded head of said second threaded fastener.

8. The system of claim 7 wherein said upper portion has a larger diameter than said lower portion, and said lower portion communicates said upper portion with said fastener chamber.

9. The system of claim 7 wherein said first threaded fastener has a non-hexagonal head.

10. The system of claim 7 further comprising a retention member, wherein said tines engage said retention member.

11. The system of claim 7 wherein said tines extend in a direction substantially perpendicular to a longitudinal axis extending through said fastener chamber and said opening.

12. A method of preventing disconnection of a coupling having a retention member, said retention member having defined therein an opening, said method comprising the steps of:
   (a) providing a device comprising a main body portion having defined therein a fastener chamber and an opening in communication therewith, said opening being located above said fastener chamber, said device further including a pair of tines in fixed spatial relation extending laterally from said main body portion
   (b) extending a first threaded fastener through said opening of said retention member and threadedly engaging said first threaded fastener with a threaded opening coaxial with said opening of said retention member, said first threaded fastener having an internally threaded head,
   (c) positioning said fastener chamber of said device over said internally threaded head of said first threaded fastener, such that said tines engage said retention member, and
   (d) engaging a second threaded fastener within said opening in said device and within said internally threaded head of said first threaded fastener.

* * * * *